Patented Dec. 14, 1943

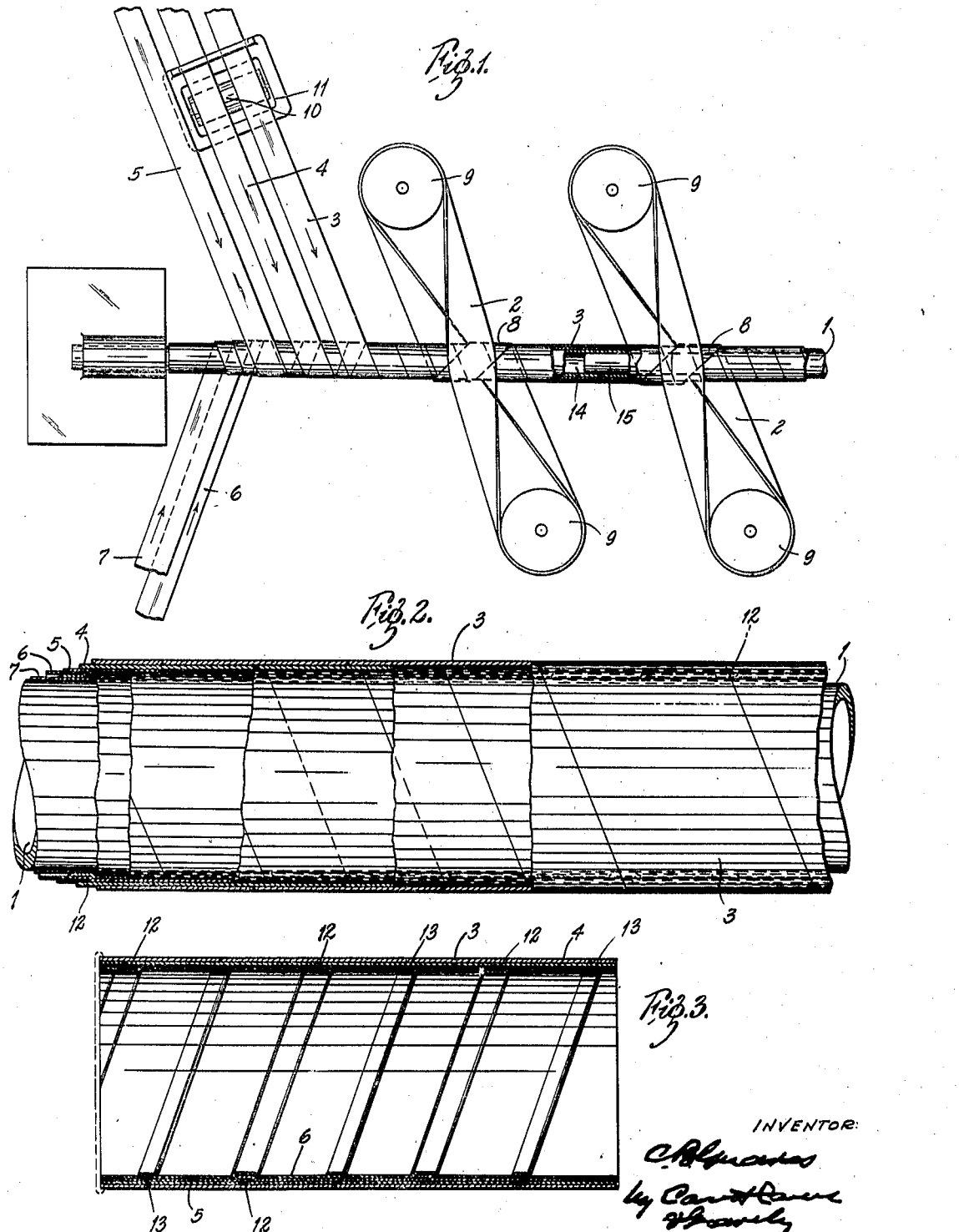

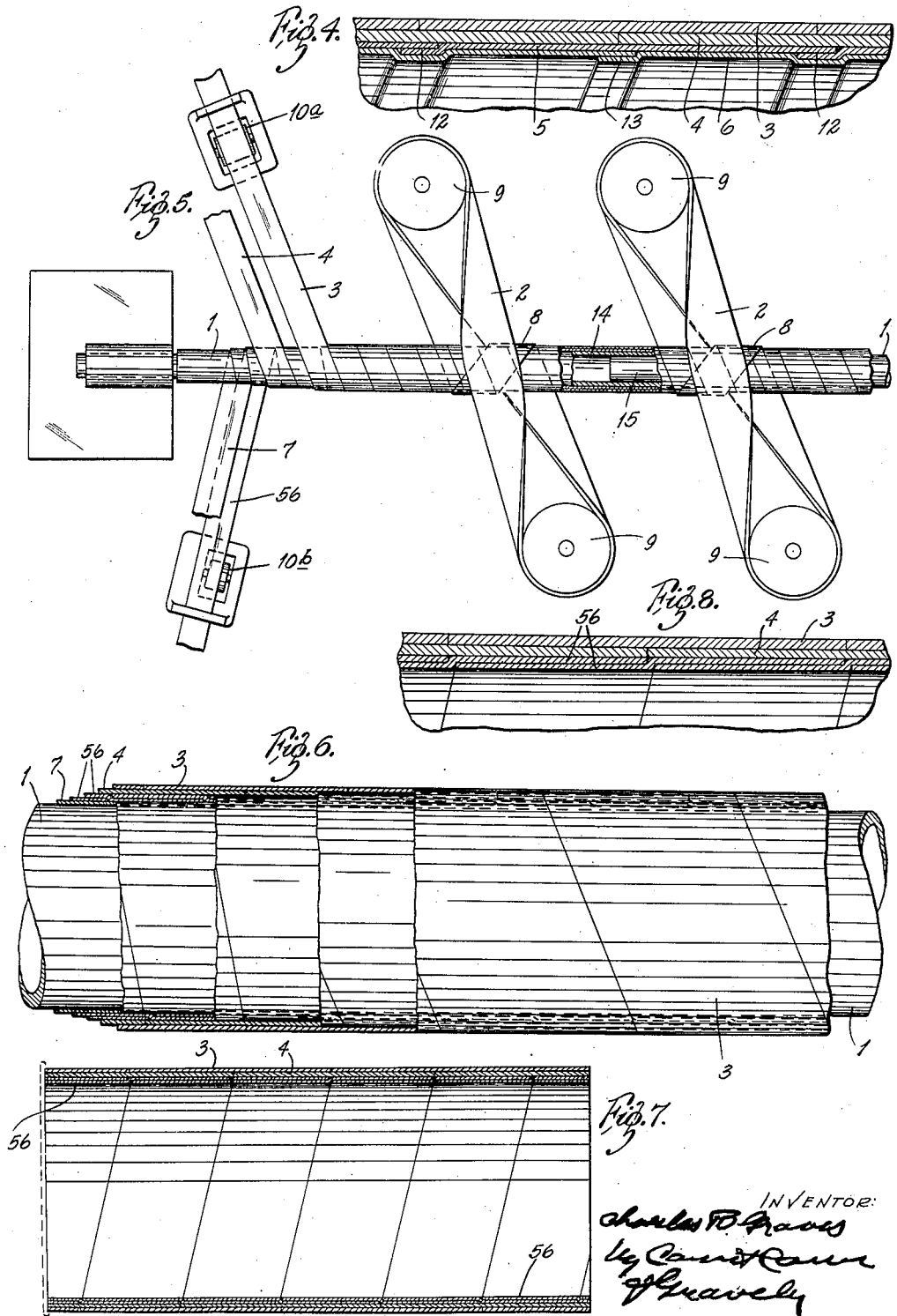

2,336,540

UNITED STATES PATENT OFFICE 2,336,540

LINED FIBER TUBING AND PROCESS
OF MAKING SAME

Charles B. Graves, Maplewood, Mo., assignor to Sefton Fibre Can Company, Maplewood, Mo., a corporation of Delaware Application September 26, 1941, Serial No. 412,352

3 Claims. (Cl. 93—94)

This invention relates to tubing of the kind comprising a helically wound fiber body and a helically wound lining made from a thin sheet of transparent thermoplastic material, such as that known under the trade name of "Pliofilm," which becomes co-adhesive or self-sealing under the application of heat and is waterproof and oil proof and resistant to most materials which might be packed in cans having bodies cut from said tubing.

Heretofore such lining consisted of a single strip of helically wound Pliofilm having its adjacent edges overlapped and heat-sealed, leaving a single thickness of Pliofilm between the joints. Such material has an occasional pinhole or minute perforation, which is impossible to prevent in manufacture and which causes some of the can bodies cut from the above described tubing to leak and the material packed therein to spoil; and there is also a possibility of leakage through improperly heat-sealed portions of the overlapped edges of the helically wound lining strip.

The principal object of the present invention is to product a helically wound Pliofilm lined tube that will overcome the objections hereinbefore pointed out. The invention consists in incorporating in the fiber body of the tube a lining comprising two plies of helically wound Pliofilm that are heat-sealed together over their entire contacting areas; it also consists in forming such lining from two separate strips of Pliofilm that are helically wound one over another and heat-sealed together, with adjacent edge portions of each helically wound strip overlapped and heat-sealed and offset relative to the overlapped and heat-sealed edge portions of the other helically wound strip; it also consists in forming such lining from a single strip of helically wound Pliofilm having adjacent portions heat-sealed and overlapped far enough to produce a continuous multi-ply lining; and it also consists in the process hereinafter described and claimed.

In the accompanying drawings, which form part of this specification and wherein like symbols refer to like parts wherever they occur, Fig. 1 is a plan view of a portion of an apparatus for helically winding a lined tube embodying my invention, Fig. 2 is a part sectional and part side elevational view showing the tubing and lining on the mandrel, Fig. 3 is a longitudinal sectional view through a section cut from said tubing to form a lined can body, Fig. 4 is an enlarged fragmentary longitudinal section through the tubing; and Figs. 5, 6, 7 and 8 are views similar to Figs. 1, 2, 3 and 4, respectively, illustrating a modification of the invention.

The apparatus employed in the process of winding my lined fiber tubing comprises a stationary longitudinal mandrel 1 and one or more endless belts 2 for winding a plurality of strips 3, 4, 5, 6 and 7 helically about said mandrel and for pressing the helically wound strips together on said mandrel and for sliding them axially thereof. Each of the belts 2 is a cross belt that is disposed at an oblique angle to the mandrel axis and has its lower stretch wrapped around the mandrel in a helical coil 8 so as to exert an angular thrust on the tube being formed and thereby slide the same endwise along said mandrel. Each of these endless pressing, winding and feeding belts passes around and is driven by a pair of pulleys 9, located one on each side of the mandrel 1. The helical tube winding machine hereinbefore described is well known and it is considered unnecessary to illustrate it in detail. The strips 3, 4, 5, 6 and 7 are supplied from suitable rolls (not shown), the two outermost strips 3 and 4 being drawn from the same side of the mandrel over a suitable roller 10 that rotates in liquid adhesive contained in a suitable reservoir 11 that is preferably adapted to apply a coating of adhesive to the underside of said strips whereby the adhesive on the underside of the strip 3 serves to secure said strip to the strip 4 and the adhesive on the underside of the strip 4 serves to secure this strip to the strip 5. Each of the two outermost strips 3 and 4 is preferably made of relatively thick paper, such as chip board, fiberboard or the like, and is preferably wound in the form of a right-hand helix with the adjacent edges of successive turns or convolutions in abutting relation and with the joints of one strip offset with respect to the joints of the other strip.

The strips 5 and 6, which form a lining for the helically wound chip board strips 3 and 4, are made of a thin transparent thermoplastic material that becomes co-adhesive or self-sealing upon the application of heat thereto. A material having such characteristics has become known under the trade name of "Pliofilm," which is made from a rubber base and is also waterproof and oilproof and resistant to attack by most materials which might be packed in cans made from sections made from the hereinbefore described helically wound tubing.

As shown in the drawings, the outermost lining strip 5 of Pliofilm is preferably drawn from the same side of the mandrel as the chip-board body forming strips 3 and 4 and is wound about said mandrel in the form of a right-hand helix just in advance of the similarly wound innermost chip-board strip 4, with the adjacent side edges of said Pliofilm lining strip helically overlapped as at 12. The other or innermost Pliofilm lining strip 6 is drawn from the opposite side of the mandrel and is wound around said mandrel just in advance of the outermost Pliofilm lining strip 5 in the form of a right-hand helix with the adjacent side edges of said Pliofilm lining strip overlapped as at 13. As shown in the drawings, the overlapped side margins 12 and 13 of the helically wound inner and outer Pliofilm lining strips 5 and 6, respectively, are offset with relation to each other longitudinally of the axis about which said strips are wound.

One of the characteristics of the Pliofilm material is that it tends to cling closely to anything in contact therewith. Thus, the two helically wound Pliofilm lining strips 5 and 6 and their overlapped margins tend to cling together over their entire area of surface contact. The strip 7 is a thin paper strip that is preferably drawn from the same side of the mandrel as the innermost Pliofilm lining strip 6 and is also wound in the form of a right-hand helix directly upon the mandrel just in advance of the innermost Pliofilm lining strip 5. This helically wound paper strip 7 is used only for the purpose of preventing the innermost Pliofilm lining strip 6 from clinging to the mandrel and is easily withdrawn from the finished tubing after it leaves said mandrel.

Mounted in a suitable chamber 14 provided therefor in the mandrel 1 adjacent to the rearmost belt is a suitable device 15 for heating a portion of said mandrel and the Pliofilm lining strips 5 and 6 helically wound therearound. This heated portion of the mandrel is preferably located in the region of the rearmost winding, pressing and feeding belt, so that the portion of the mandrel on which the several strips are started remains cool enough to prevent burning of the operator's hands. This heated portion of the mandrel serves to hermetically seal the continuously overlapped edges of each of the two helically wound Pliofilm lining strips 5 and 6 and it also serves to heat-seal the two strips together over the entire contacting surfaces thereof. This heat, together with the pressure applied by the belt, effects an autogenous union or weld between the two helically wound lining strips, whereby said two strips become, in effect, substantially a single relatively thick helically wound Pliofilm strip. Thus, an occasional pinhole or minute perforation in either of the helically wound otherwise impervious Pliofilm strips is sealed or at least covered by the other helically wound Pliofilm lining strip, thereby preventing leakage or spoilage of the contents of the can due to such pinholes or perforations. This union or weld of the two Pliofilm lining strips also prevents any leakage between the two strips or between the overlapped edges thereof.

The modified form of the invention illustrated in Figs. 5, 6, 7 and 8 includes the hereinbefore disclosed mandrel 1, the heating element 15, the endless winding, pressing and feeding belts 2 and the paper strips 3, 4 and 7. In this modification, however, a single Pliofilm lining strip 56 is used to form the multi-ply impervious lining, successive turns of this single helically wound Pliofilm lining being preferably overlapped for a distance corresponding to substantially one-half the width of said strip, thereby producing a two-ply lining. The number of plies, however, may be increased by increasing the width of the overlap. In this modification, the heated portion of the mandrel, together with the pressure applied by the belt, causes the overlapped portions of the helically wound Pliofilm lining strip 56 to become united and thus form a substantially single relatively thick helically wound Pliofilm lining. Thus, an occasional pinhole or perforation in one portion of the strip is overlapped and covered and sealed by another portion thereof, thereby preventing leakage or spoilage of the contents of the can due to such holes.

As shown in Fig. 5, adhesive is applied by the roller 10a to the outermost chip-board body forming strip 3, while the adhesive for securing the Pliofilm lining strip 56 to the innermost body forming strip 4 is applied by a suitable applicator 10b to the lower surface of said Pliofilm lining strip. The adhesive, instead of being applied to the underside of said innermost body forming strip, is applied to the Pliofilm lining strip 56 along about one-half only of the width thereof; that is, for a distance corresponding substantially to the portion of the strip that is to be brought into contact with the innermost body forming strip 4. This manner of applying the adhesive for securing the lining strip to the body forming strip minimizes the danger of the adhesive being absorbed by said body forming strip and thus losing its effectiveness before reaching said lining strip.

What I claim is:

1. A container body comprising a tube of paper or the like and an impervious lining therefor, said lining comprising two separate strips of thermoplastic material helically wound one over another in direct surface contact and heat-sealed together, adjacent edge portions of the turns or convolutions of each helically wound strip being overlapped in direct surface contact and heat-sealed together and offset relative to the overlapped and heat-sealed edge portions of the turns or convolutions of the other helically wound strip.

2. A container body comprising a tube of paper or the like and an impervious lining located within and adhesively secured to said tube, said lining comprising two separate strips of Pliofilm that are helically wound one over another in direct surface contact and heat-sealed together over their entire contact areas, the marginal portions of adjacent convolutions of each of said helically wound strips being overlapped in direct surface contact and heat-sealed together and offset relative to the overlapped and heat-sealed margins of the convolutions of the other helically wound strip.

3. The process of manufacturing helically wound paper tubing with an impervious Pliofilm lining of heat-sealable material which consists in helically winding two separate strips of Pliofilm one over another around a mandrel with the edge portions of each helically wound lining strip overlapped and offset relative to the overlapped edge portions of the other helically wound lining strip, helically winding a body strip of paper around and adhesively securing it to the outermost helically wound lining strip, and then applying heat to the internal surface of the innermost helically wound lining strip after the body strip is wound thereon but before said tubing leaves said mandrel to thereby heat-seal the two helically wound lining strips over their entire contacting areas and to heat-seal the overlapped edge portions of each helically wound lining strip.

CHARLES B. GRAVES.